United States Patent
Chéné et al.

(10) Patent No.: US 11,399,056 B2
(45) Date of Patent: *Jul. 26, 2022

(54) MOBILE CORE CLIENT ARCHITECTURE

(71) Applicant: ProntoForms Inc., Kanata (CA)

(72) Inventors: Marc Chéné, Ottawa (CA); Liam Peyton, Ottawa (CA); Kevin McGuire, Kanata (CA); Brant Drummond, Dunrobin (CA)

(73) Assignee: ProntoForms Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,676

(22) Filed: Dec. 18, 2018

(65) Prior Publication Data

US 2019/0124139 A1 Apr. 25, 2019

Related U.S. Application Data

(63) Continuation of application No. 14/796,311, filed on Jul. 10, 2015, now Pat. No. 10,193,960, which is a
(Continued)

(51) Int. Cl.
*G06F 15/16* (2006.01)
*H04L 67/10* (2022.01)
(Continued)

(52) U.S. Cl.
CPC ............. *H04L 67/10* (2013.01); *G06Q 10/10* (2013.01); *H04L 41/508* (2013.01);
(Continued)

(58) Field of Classification Search
CPC . G06F 17/243; G06F 17/30554; H04L 67/12; H04L 67/02
See application file for complete search history.

(56) References Cited

U.S. PATENT DOCUMENTS

| 2004/0153373 | A1* | 8/2004 | Song | G06Q 30/02 705/26.1 |
| 2004/0176958 | A1* | 9/2004 | Salmenkaita | H04M 1/72572 704/275 |

(Continued)

*Primary Examiner* — Oleg Survillo
(74) *Attorney, Agent, or Firm* — Stratford Group Ltd.

(57) ABSTRACT

Methods and systems are disclosed for automatically managing multiple types of applications, electronic forms, electronic forms data instances, network services and, network services. The methods and systems allow organizations with a mobile workforce that relies on established business processes to execute timely and secure exchange of information while providing easy to use, fast, accurate and flexible information capture capability in the field. These organizations and/or third-party providers may optimize the design of mobile applications to better match existing corporate processes and forms in order to reflect existing business needs, preferred graphical user interfaces, processes and experiences on the mobile devices. Organizations and/or third-party providers may also build mobile applications that allow information to be automatically created and updated both online and offline and synchronized or routed to another mobile device, an application server, web service, software-as-a-service (SaaS), database or website.

15 Claims, 5 Drawing Sheets

Related U.S. Application Data continuation of application No. 12/522,686, filed as application No. PCT/IB2008/000055 on Jan. 11, 2008, now Pat. No. 9,113,282.

(60) Provisional application No. 60/884,785, filed on Jan. 12, 2007.

(51) Int. Cl.
*H04L 67/51* (2022.01)
*G06Q 10/10* (2012.01)
*H04L 41/50* (2022.01)
*H04L 67/04* (2022.01)
*H04W 4/00* (2018.01)
*H04L 41/082* (2022.01)
*H04W 28/14* (2009.01)

(52) U.S. Cl.
CPC .......... *H04L 41/5058* (2013.01); *H04L 67/04* (2013.01); *H04L 67/16* (2013.01); *H04W 4/00* (2013.01); *H04L 41/082* (2013.01); *H04W 28/14* (2013.01)

(56) References Cited

U.S. PATENT DOCUMENTS

| | | | |
|---|---|---|---|
| 2006/0148528 A1* | 7/2006 | Jung | G06Q 10/109 |
| | | | 455/566 |
| 2007/0288468 A1* | 12/2007 | Sundaresan | G06Q 30/08 |
| 2008/0222118 A1* | 9/2008 | Scian | H04M 1/2757 |

* cited by examiner

MOBILE CORE CLIENT ARCHITECTURE

CROSS REFERENCE TO RELATED APPLICATIONS

This application is a continuation of U.S. application Ser. No. 14/796,311, filed Jul. 10, 2015, now allowed, which is a continuation of U.S. application Ser. No. 12/522,686, filed Jul. 9, 2009, now issued as U.S. Pat. No. 9,113,282, which is a U.S. national stage filing of international Application No. PCT/IB2008/000055, filed Jan. 11, 2008, which claims priority to U.S. Provisional Application No. 60/884,785, filed Jan. 12, 2007, each of which is hereby incorporated by reference herein in its entirety.

FIELD OF THE INVENTION

The present invention is directed to mobile devices and applications therefor. More particularly, the invention is directed to methods and systems for managing multiple types of applications in such mobile devices.

BACKGROUND OF THE INVENTION

The increasing popularity of handheld mobile devices, such as mobile phones, personal digital assistants (PDA), and the like, coupled with advances in wireless networking technologies, is enabling new classes of mobile applications. For example, field force industries that heretofore captured information on paper-based forms may now record the information (manually and/or automatically) in electronic forms using applications on their mobile devices. It is also possible for organizations to define and deploy their own mobile device applications and forms as well as any business processes associated therewith. An example of a method and system for defining and deploying mobile device forms, applications, business processes, and the like, is described in U.S. Published Patent Application No. US2006161646, entitled "POLICY-DRIVEN MOBILE FORMS APPLICATIONS," filed Jan. 18, 2006, assigned to TrueContext Corp. of Ottawa, Canada and incorporated herein by reference in its entirety. The forms, applications, business processes, and so forth, may then be provided to the mobile device users through a managed service provider ("MSP") hosted environment.

In existing mobile devices, however, management of the various mobile applications, electronic forms and data therein, and corresponding business processes, is largely a manual process. Typically, mobile users must personally monitor the status of any instance of electronic forms data (e.g., completed?, ready to be sent?, etc.), track the different applications being used, perform any maintenance on such applications, and the like. Uploading the instances of electronic forms data and the information therein, for example, to a centralized database, or sharing the electronic form data with other mobile devices via the World Wide Web ("the web"), also must be done manually. Similarly, there is currently no way to automatically track updates to mobile applications, electronic forms and business processes, and to synchronize them with a back-end server. To the extent any of the above tasks may be automated, each software developer or software provider presently provides its own automation component that is applicable only to that software provider's applications, electronic forms and business processes. The result is an uncoordinated set of applications, electronic forms, and business processes on the mobile device that is inconvenient and burdensome to manage and contributes to inefficient use of time and mobile device computing resources.

Thus, despite recent advances, there is a need in mobile devices for a unified way to automatically manage multiple applications, multiple types of electronic forms, electronic forms data instances, business processes, and/or network services from different software providers. More particularly, there is a need in mobile devices to be able to allow mobile applications to automatically detect, monitor, and process electronic forms, electronic forms data instances, business processes, and/or network services from different software providers according to each provider's business processes, and the like.

SUMMARY OF THE INVENTION

The present invention is directed to methods and systems for managing multiple types of applications, electronic forms, electronic forms data instances, business processes, and/or network services from different software providers. The methods and systems of the invention allow organizations with a mobile workforce that relies on established business processes to automatically execute timely and secure exchange of information while providing easy to use, fast, accurate and flexible information capture capability in the field. As a result, these organizations and/or third-party providers may more easily optimize the design of mobile applications to better match existing corporate processes and forms in order to reflect existing business needs, preferred graphical user interfaces (GUI), processes and experiences on the mobile devices. Organizations and/or third-party providers may also build mobile applications that allow information to be automatically created and updated online and offline as well as synchronized or routed to another mobile device, an application server, web service, Software-as-a-Service (SaaS), database or website.

In general, in one aspect, the invention is directed to a method for managing mobile applications, electronic forms, data instances, business processes, and network services from multiple software providers in a mobile device. The method comprises executing a plurality of mobile applications on the mobile device, each mobile application operable with a different electronic form, electronic forms data instance, business process, and network service. The method also comprises storing context information for each mobile application, electronic form, electronic forms data instance, business process and network service on the mobile device, the context information being stored by a unified mobile resource contextualization engine. The method further comprises allowing the mobile applications to access the context information, wherein each mobile application is configured to automatically process a respective electronic form and electronic forms data instance according to a respective business process and network service using the context information.

In general, in another aspect, the invention is directed to a system for managing mobile applications, electronic forms, electronic forms data instances, business processes, and network services from multiple software providers in a mobile device. The system comprises at least one subsystem configured to execute a plurality of mobile applications on the mobile device, each mobile application operable with a different electronic form, electronic forms data instance, business process, and network service. The system also comprises at least one subsystem configured to store context information for each mobile application, electronic form, electronic forms data instance, business process and network service on the mobile device, the at least one subsystem including a unified mobile resource contextualization engine configured to store the context information. The system further comprises at least one subsystem configured to allow the mobile applications to access the context information, wherein each mobile application is configured to automatically process a respective electronic form and electronic forms data instance according to a respective business process and network service using the context information.

In general, in yet another aspect, the invention is directed to a computer-readable storage medium encoded with computer-readable instructions for managing mobile applications, electronic forms, electronic forms data instances, business processes, and network services from multiple software providers in a mobile device. The computer-readable instructions comprise instructions for causing the mobile device to execute a plurality of mobile applications on the mobile device, each mobile application operable with a different electronic form, electronic forms data instance, business process, and network service. The computer-readable instructions also comprise instructions for causing the mobile device to store context information for each mobile application, electronic form, electronic forms data instance, business process and network service on the mobile device using a unified mobile resource contextualization engine. The computer-readable instructions further comprise instructions for causing the mobile device to allow the mobile applications to access the context information, wherein each mobile application is configured to automatically process a respective electronic form and electronic forms data instance according to a respective business process and network service using the context information.

In general, in still another aspect, the invention is directed to method for managing mobile applications in a mobile device, the method comprising executing a plurality of mobile applications on the mobile device, each mobile application operable with a different electronic form. The method also comprises storing context information for each mobile application and electronic form on the mobile device, the context information being stored by a unified mobile resource contextualization engine. The method further comprises allowing the mobile applications to access the context information, wherein each mobile application is configured to automatically process a respective electronic form using the context information.

In general, in yet another aspect, the invention is directed to a method for managing mobile applications, electronic forms, data instances, business processes, and network services from multiple software providers in a mobile device. The method comprises storing context information for one or more of a mobile application, an electronic form, an electronic forms data instance, a business process and a network service, or any combination thereof, on the mobile device, the context information being stored by a unified mobile resource contextualization engine. The method also comprises executing the mobile applications on the mobile device, each mobile application operable with a different electronic form, electronic forms data instance, business process, and network service. The method further comprises allowing the mobile applications to access the context information, wherein each mobile application is configured to automatically process one or more of a respective electronic form and electronic forms data instance according to a respective business process and network service using the context information.

In general, in still another aspect, the invention is directed to a method for managing mobile applications, electronic forms, data instances, business processes, and network services from multiple software providers in a mobile device. The method comprises storing context information for one or more of a mobile application, an electronic form, an electronic forms data instance, a business process or a network service, or any combination thereof, on the mobile device, the context information being stored by a unified mobile resource contextualization engine. The method also comprises executing the mobile applications on the mobile device, each mobile application operable with a different electronic form, electronic forms data instance, business process, and network service. The method further comprises allowing the mobile applications to access the context information, wherein each mobile application is configured to automatically process one or more of a respective electronic form and electronic forms data instance according to a respective business process and network service using the context information.

In general, in yet another aspect, the invention is directed to a method for managing mobile applications, electronic forms, data instances, business processes, and network services from multiple software providers in a mobile device. The method comprises storing context information on the mobile device, the context information being stored by a unified mobile resource contextualization engine, and executing a mobile application on the mobile device. The method further comprises allowing the mobile application to access the context information, wherein the mobile application is configured to automatically process one or more of a respective electronic form and electronic forms data instance according to a respective business process and network service using the context information.

DETAIL DESCRIPTION OF PREFERRED EMBODIMENTS

Figure 1:
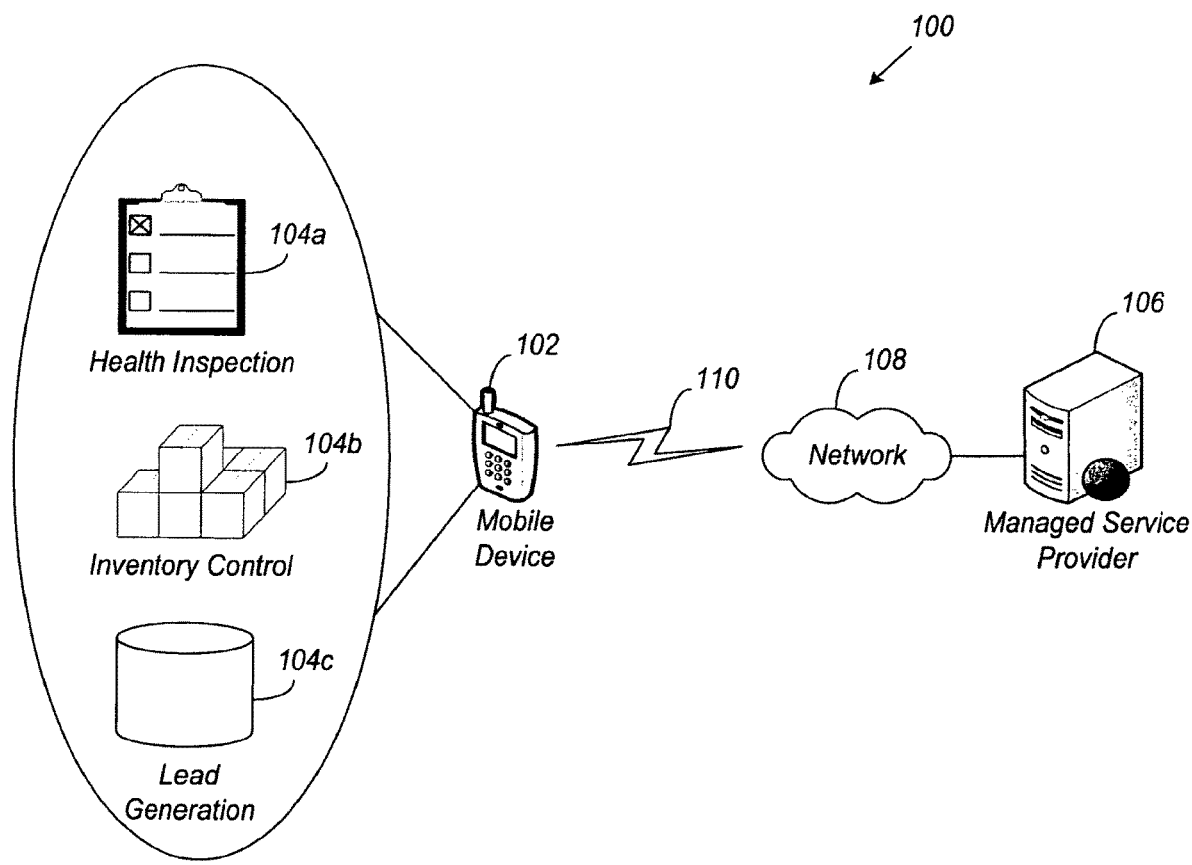
FIG. 1 illustrates an example of a system for automatically managing applications, electronic forms, electronic forms data instances, business processes, and/or network services from multiple software providers according to embodiments of the invention.

In the following detailed description of preferred embodiments and other embodiments of the invention, reference is made to the accompanying drawings. Those of ordinary skill in the art will readily see that other embodiments and changes may be made without departing from the scope of the invention.

As alluded to previously, mobile device applications are increasingly supporting multiple means of manually and automatically capturing or updating information through different interfaces and methods. Managing this information and providing a flexible, secure framework for working with online and offline content in a mobile device is important to improving the productivity and effectiveness of mobile field personnel and mobile application solutions. Embodiments of the invention satisfy the above needs by providing field personnel (or their mobile devices) with a way to securely synchronize and connect with corresponding business systems, such as application servers, web services, SaaS, databases and websites, both online and offline. Thus, captured information may be shared with other mobile devices, exposed over the web, orchestrated and/or organized for integration to legacy back-end systems, databases, applications and other hosted services and applications. This includes tracking the state of the business processes in which the information is being shared.

In some embodiments, the invention accomplishes the above by allowing mobile devices to be aware of and use context information for various mobile applications, electronic forms, and business processes running thereon. As used herein, the term "context information" refers to information that characterizes the capabilities and requirements of each application, electronic form data instance and business process. Such context information may include, for example, which electronic forms are to be used with which software applications and/or which network services, and whether the applications and services reside in the mobile device and/or on an application server, web service, SaaS, database and website, both online and offline. Context information may also include the status of each electronic forms instance and its business process; for example, whether and when the form is to be sent back to the application server, web service, database, and so forth. Context information may additionally include supporting files for applications, electronic forms, and business processes (e.g., company logos and other image files, help files, business policies and rules, configuration files, etc.). Furthermore, configurations of an application, electronic form, or business process that have been applied by a user to make the forms solution more suitable to the user's requirements may also be included in context information. Other examples of context information may include times, dates, schedules, and/or conditions for synchronizing each electronic form data instance with the application server, web service, database, and so forth, where applicable. In some embodiments, the context information may also include a listing of any errors that may have occurred during execution of the mobile applications.

Referring now to FIG. 1, a system 100 for automatically managing applications, electronic forms, and business processes from multiple software providers according to embodiments of the invention is shown. The term "business process" is used herein to refer to a sequence of events or transitions from one business state to another where the state is characterized by the information captured, context information, and any business process policies and/or rules that govern sharing of data between users or with network services. The term "network service" refers to a service that can provide information capture or that can be a source of information.

As can be seen in FIG. 1, the system 100 comprises at least one mobile device 102 capable of executing a plurality of mobile applications thereon (i.e., start, stop, and/or suspend the applications using any process available on the mobile device). In general, such mobile applications may include any application capable of using one or more forms to automatically and/or manually capture information via the mobile device 102. Examples of such applications may include LeadGenesys from LeadGenesys, Inc. of San Francisco, Calif., Outlook from Microsoft Corp. of Redmond, Wash., and other similar applications. A single instance of data collected by these mobile applications in an electronic form is generally referred to as an "electronic forms data instance" or simply "data instance." Such an electronic forms data instance is generally defined as any electronic data produced by a process that may be shared with other applications, users, and enterprise applications. Examples of electronic forms data instances that may be captured by applications running on a mobile device or enterprise system may include data files (e.g., XML document, image capture, binary content, etc.), streaming binary data (e.g., audio, video, etc.), and the like.

In the illustrative embodiment of FIG. 1, the applications are shown to include, by way of example, a health inspection application 104a, an inventory control application 104b, and a lead generation application 104c. These applications 104a-c typically (but not necessarily) have one or more electronic forms (e.g., a checklist, manifest, contact sheet, etc.) on which information may be captured and stored as an electronic forms data instance. The state (e.g., completed?, ready to be sent?, etc.) of the electronic forms data instances usually dictate when they are shared or sent to other users or to back-end services available through the managed service provider.

A managed service provider 106 provides the mobile device 102 with the various electronic forms and supporting services and files and, in some instances, the mobile applications corresponding to the electronic forms. The managed service provider 106 typically provides the electronic forms and/or mobile applications to the mobile device 102 over a network 108 (e.g., the Internet) via a suitable wireless connection 110 (e.g., a cellular link). Examples of services that may be provided by the managed service provider 106 include mXForms, mXDocs, and/or mExperience available from TrueContext Corp. of Ottawa, Canada and other similar services.

In accordance with embodiments of the invention, the managed service provider 106 may also provide the mobile device 102 with context information for the electronic forms. Such context information may then be used by the mobile applications and related network services to automatically detect, monitor, and process the electronic forms. This arrangement offers a unified way in the mobile device 102 to manage multiple types of electronic forms from different organizations and/or third-party providers without having to deploy a separate automation component for each provider on the mobile device 102. Furthermore, the organizations and/or third-party providers may be confident that any business processes they have defined will be complied with based on the application of the context information.

Figure 2:
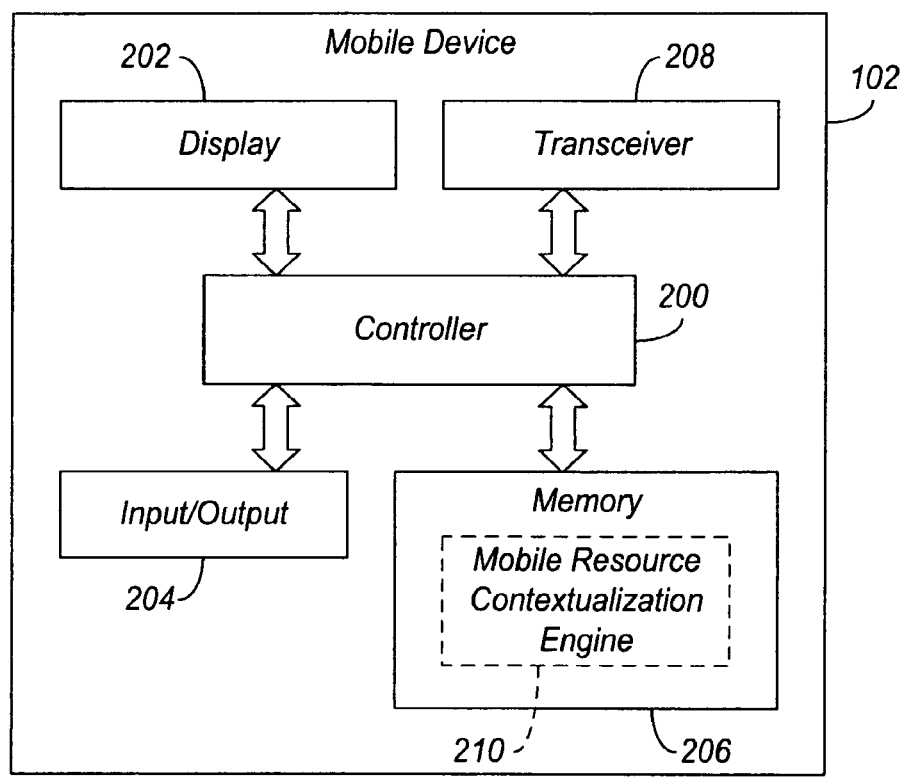
FIG. 2 illustrates an example of mobile device configured to automatically manage multiple applications, electronic forms, electronic forms data instances, business processes, and/or network services from multiple software providers according to embodiments of the invention.

FIG. 2 illustrates the mobile device 102 of the invention in more detail. As can be seen, the mobile device 102 has a number of functional components, including a controller 200, a display unit 202, an input/output unit 204, a memory unit 206, and a transceiver unit 208. These components of the mobile device 102 are generally well known to those having ordinary skill in the art and will therefore be described only briefly here. Furthermore, although multiple discrete components are shown in FIG. 2, any two or more of these components may be combined into a single component, and any single component may be divided into several constituent components, as needed. Moreover, one or more components may be added to or removed from the mobile device 102 as needed without departing from the scope of the invention.

In general, the controller 200 is responsible for the overall operation of the mobile device 102, including execution of various software programs thereon, such as the mobile device operating system ("OS") and mobile applications. The display unit 202 is generally responsible for rendering all images and text on the mobile device 102, including any electronic forms used on the mobile device 102. The input/output unit 204 is responsible for receiving and translating information received by the mobile device 102 into electrical signals that can be stored in or otherwise associated with the electronic forms. The memory unit 206, which may include any temporary and/or long-term computer-readable storage medium, provides storage for software programs and information (or the computer-readable equivalent thereof) that may be used by the mobile device 102. The transceiver unit 208 is responsible for sending and receiving signals to/from the mobile device 102 from/to the network 108 (see FIG. 1). To this end, the transceiver unit 208 performs all tasks known to those having ordinary skill in the art for communicating with the network 108, such as adjusting the strength of transmitted signals, frequency up/down conversion, modulation/demodulation, encoding/decoding, and other related tasks, where applicable.

As for the wireless connection 110 (represented in FIG. 1), any suitable wireless network may be used. For example, the wireless connection 110 may be a cellular network, such as GSM, CDMA, EDGE/GPRS, UMTS, and the like. The wireless connection 110 may also include a direct wireless network, such as WiFi, 802.11a/b/g, Bluetooth, wireless LAN, and so forth. In the latter case, two or more mobile devices 102 may be connected directly to each other over the wireless connection 110.

In accordance with embodiments of the invention, a unified mobile resource contextualization engine 210 may be stored in the memory 206 for automatically managing mobile applications, electronic forms, electronic forms data instances, business processes, and/or network services from multiple software providers on the mobile device 102. The mobile resource contextualization engine 210 allows the mobile device 102 to be aware of and use context information for each application, electronic form, electronic forms data instance, business process, and/or network service. Specifically, the mobile resource contextualization engine 210 allows mobile applications to automatically detect, monitor, and process each electronic form using the context information for that electronic form and enables data sharing and network services as dictated by the business processes. Such an arrangement helps ensure that the mobile applications running on the mobile device 102 and the various electronic forms therefor comply with established business processes, and the like.

Figure 3:
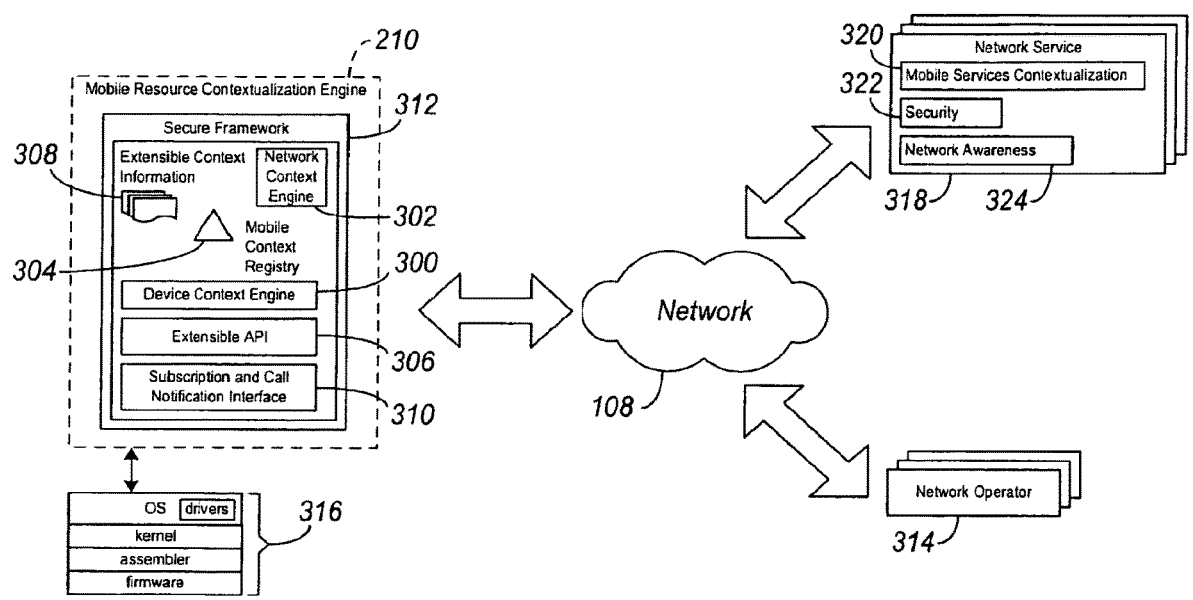
FIG. 3 illustrates an example of a mobile resource contextualization engine capable of automatically managing multiple applications, electronic forms, electronic forms data instances, business processes, and/or network services from multiple software providers according to embodiments of the invention.

FIG. 3 illustrates an example of the unified mobile resource contextualization engine 210 in more detail according to embodiments of the invention. As can be seen in FIG. 3, the mobile resource contextualization engine 210 comprises a number of functional components, each of the functional components operating in conjunction with one or more other functional components to allow the mobile device 102 and the applications running thereon to be aware of and use context information for the electronic forms, electronic forms data instances, business processes, and/or network services. Such a unified mobile resource contextualization engine 210 may handle resource and service requests from both the mobile applications running on the mobile device 102 as well as any network services used by the mobile device 102. Note that although discrete functional components are shown in FIG. 3, those having ordinary skill in the art will understand that two or more of these components may be combined into a single component, and that a single component may be divided into several constituent components, as needed.

In the embodiment of FIG. 3, the functional components of the mobile resource contextualization engine 210 include a device context engine 300, a network context engine 302, a mobile context registry 304, an extensible application programming interface (API) 306 and extensible context information 308, and a subscription and call notification interface 310. A secure framework 312 allows network operators and/or enterprise administrators 314 to control access to any context information 308 exposed to mobile applications running on the mobile device 102. As mentioned above, each functional component may operate in conjunction with one or more other functional components to allow the mobile device 102 and the applications running thereon to utilize context information for the electronic forms, electronic forms data instances, business processes, and/or network services. For example, the network context engine 302 and/or the device context engine 300 may communicate with the mobile context registry 304 and the extensible context information 308. A mobile device operating system, including drivers therefor, as well as a kernel, assembler, and firmware, are shown generally at 316.

In general, the device context engine 300 is responsible for accessing or discovering and communicating (i.e., exchanging information) with all information capture resources available on the mobile device 102. Such information capture resources may include, but are not limited to, mobile device integrated and non-integrated information capture and input peripherals (e.g., camera, GPS, scanner, magnetic card reader, RFID readers, etc.). The device context engine 300 thereafter makes these information capture resources available as needed to the various mobile applications running on the mobile device 102.

The network context engine 302 is responsible for accessing or discovering and communicating with network services 318 that are available to the mobile device 102 over the network 108. Such network services 318 may comprise subscription-based services as well as usage-base services and may include, for example, SIP, SMTP, SMS, location mapping, call conferencing, and the like, depending on the information capture resources available on the mobile device 102. These network services 318 preferably have a mobile service contextualization component 320 that generates and provides context information to the mobile device 102 for the various mobile applications and network services 318. Preferably, each network service 318 also has a security component 322 for controlling access to the network services 318. Such access control may be implemented, for example, via a password protection scheme, an encryption scheme, biometric input, and the like. A network awareness component 322 of the network services 318 facilitates discovery of the network services 318 by the mobile device 102.

The mobile context registry 304 maintains a registry or listing of all electronic forms, electronic forms data instances, the mobile applications associated with each electronic form and data instance, business processes, and/or the network services 318 to be used with each, mobile application, electronic form, and data instance. Such a mobile context registry 304 may reside locally on the mobile device 102 or it may be available remotely over the network 108 (e.g., from the manage service provider 106). As new information capture resources, electronic forms, data instances, business processes, and/or network services become 318 available to the mobile device 102, they may also be registered or listed on the mobile context registry 304.

The extensible API 306 allows mobile applications and network services 316 to access, use, modify, and/or add to the extensible context information 308 on the mobile device 102. This extensible context information 308 is a historical store of all context information and events linked to the registry 304 of applications, electronic forms, electronic forms data instances, and network services. The extensible API 306 may also allow the mobile applications and network services 318 to access the integrated and non-integrated resources of the mobile device 102, including any information capture resources that may be available on the mobile device 102.

Finally, the subscription and call notification interface 310 allows the mobile applications running on the mobile device 102 to receive updates for the mobile applications, electronic forms, electronic forms data instances, business processes, and/or network services 318, and to subscribe to changes in context information for such mobile applications, electronic forms, electronic forms data instances, business processes, and/or network services 318.

Figure 4:
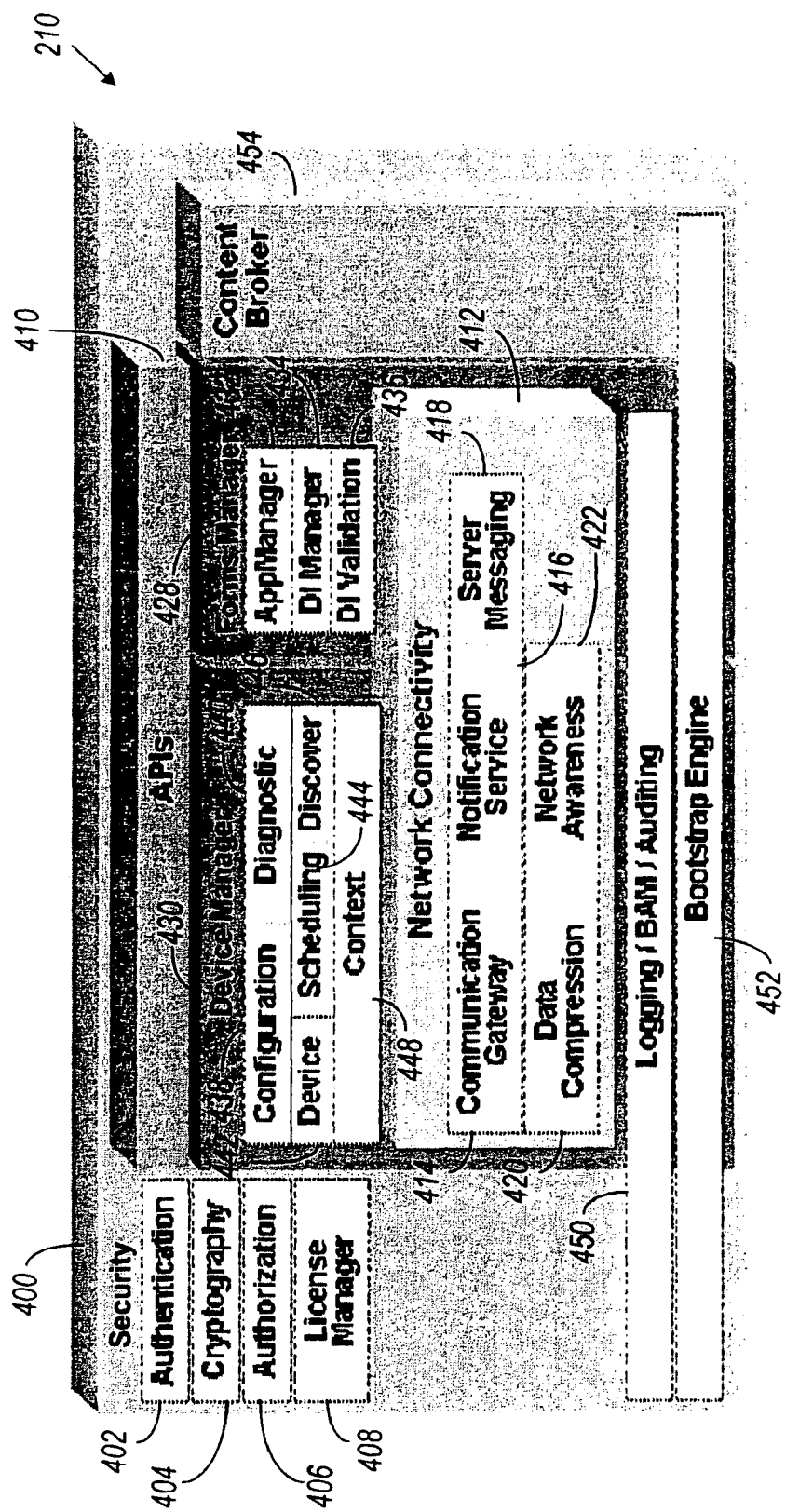
FIG. 4 illustrates a more detailed view of the mobile resource contextualization engine of FIG. 3.

Referring now to FIG. 4, another view of the mobile resource contextualization engine 210 is shown where the various functions of the engine 210 described above are illustrated in more detail. From this view, it can be seen that the mobile resource contextualization engine 210 comprises a plurality of individual modules that together enable the context information awareness and usage capability of the mobile device 102. As before, although multiple individual modules are shown in FIG. 3, those having ordinary skill in the art will understand that two or more of these modules may be combined into a single module, and that a single module may be divided into several constituent modules, without departing from the scope of the invention. Moreover, one or more modules may be added to or removed from the mobile resource contextualization engine 210 as needed without departing from the scope of the invention.

In the embodiment of FIG. 4, the mobile resource contextualization engine 210 comprises a security framework 400 that includes an authentication module 402 for limiting access to the mobile device 102 to authorized users only and a cryptography module 404 for ensuring secure, persistent storage of any information captured on the mobile device 102 and also interfacing with standard security libraries available on the operating system in some cases. An illustrative example of such a security framework 400 is mXSecure available from TrueContext Corp. of Ottawa, Canada. An authorization module 406 is also included in the security framework 400 for managing authorization of collected information to be shared with other mobile applications, as well as a license management component 408 for managing mobile application access and application information capture access. An open or extensible programming interface 410 provides access to the various services of the mobile resource contextualization engine 210 for any authorized mobile applications.

Also present is a network connectivity module 412 that comprises a gateway communication module 414 for managing communication for the mobile device 102 over any suitable network (e.g., TCP, dual IPv4 & v6, UDP, HTTP, WAP, etc.). The network connectivity module 412 further comprises a notification module 416 and a server messaging module 418 that together serve to notify any mobile application running on the mobile device 102 whenever new captured information is available for a given mobile application. A data compression module 420 provides information compression and decompression services for the mobile applications, including compressing captured information prior to transmitting the information to its destination (e.g., database, web service, SaaS, etc.). Finally, a network awareness module 422 discovers which network services 318 (see FIG. 3) are available and determines when and which network services 318 may be used to transmit the captured information to its destination.

Other modules that may be included in the mobile resource contextualization engine 210 comprise a mobile forms management module 428 and a mobile device management module 430. The mobile forms management module 428 may in turn comprise an application manager (AppManager) 432 for managing the various electronic forms used by the mobile device 102, a forms record manager (DI Manager) 434 that tracks the information captured as electronic forms data instances, and a validation component (DI Validation) 436 that validates the structure and format of the captured information according to business process rules and policies. One illustrative example of such a mobile forms management module 428 is mXForms developed by TrueContext Corp. of Ottawa Canada. The mobile device management module 430 may comprise a configuration module 438 that manages configuration settings for the mobile device 102, individual applications, electronic forms, data instances and/or business processes that can be configured by the user of the mobile device 102 or be pre-configured by the managed service provider 106 (see FIG. 1) or software provider. A diagnostic module 440 may also be included that displays and analyzes information related to the running of the mobile device 102, mobile applications, electronic forms, data instances, and/or business processes on the mobile device 102. Such analysis may be useful for debugging or supporting the mobile device 102 when problems arise. Also present are a device module 442 that tracks the characteristics and capabilities of the mobile device 102, a scheduling module 444 that schedules transmission of the information captured in the electronic forms as needed in order to comply with established business processes, a discovery module 446 that functions to discover available network services 318, and a context module 448 that stores and manages context information for the various applications, electronic forms, data instances, business processes, and/or network services 318. An illustrative example of the mobile device management module 430 is mXManage available from TrueContext Corp. of Ottawa Canada.

A logging, business activity monitoring (BAM) and auditing module 450 provides a framework for capturing a historical log of all activities and events on the mobile device 102 that can be used to capture information used by the diagnostic module 440, as well as to provide an audit trail captured by the logging, business activity monitoring (BAM) and auditing module 450, and log business process events and state changes in order to compile statistics about business activity on the mobile device 102. A bootstrap engine 452 may be used to provision (e.g., Over-the-Air, cradle, etc.) and remotely upgrade any component of the mobile resource contextualization engine 210 either in real time or according to a predetermined schedule. A content broker 454 may be used as persistent storage for J2ME/MIDP based devices that allows large content size and several different record sizes in order to scale multiple record management system (RMS).

Thus far, embodiments of the invention have been described in terms of specific functional components and modules. Following now is a description of a method or guide for providing context information awareness and usage in a mobile device. As with the functional components and modules, it should be noted that while the method comprises a series of individual steps, two or more steps may be combined into a single step, and any step may be divided into several sub-steps, without departing from the scope of the invention. In addition, one or more steps may be added to or removed from the method as needed without departing from the scope of the invention. Moreover, although the steps of the method are shown in a particular order, those having ordinary skill in the art will understand that the invention is not to be limited thereto, and that alternative sequences for the steps may certainly be implemented without departing from the scope of the invention.

Figure 5:
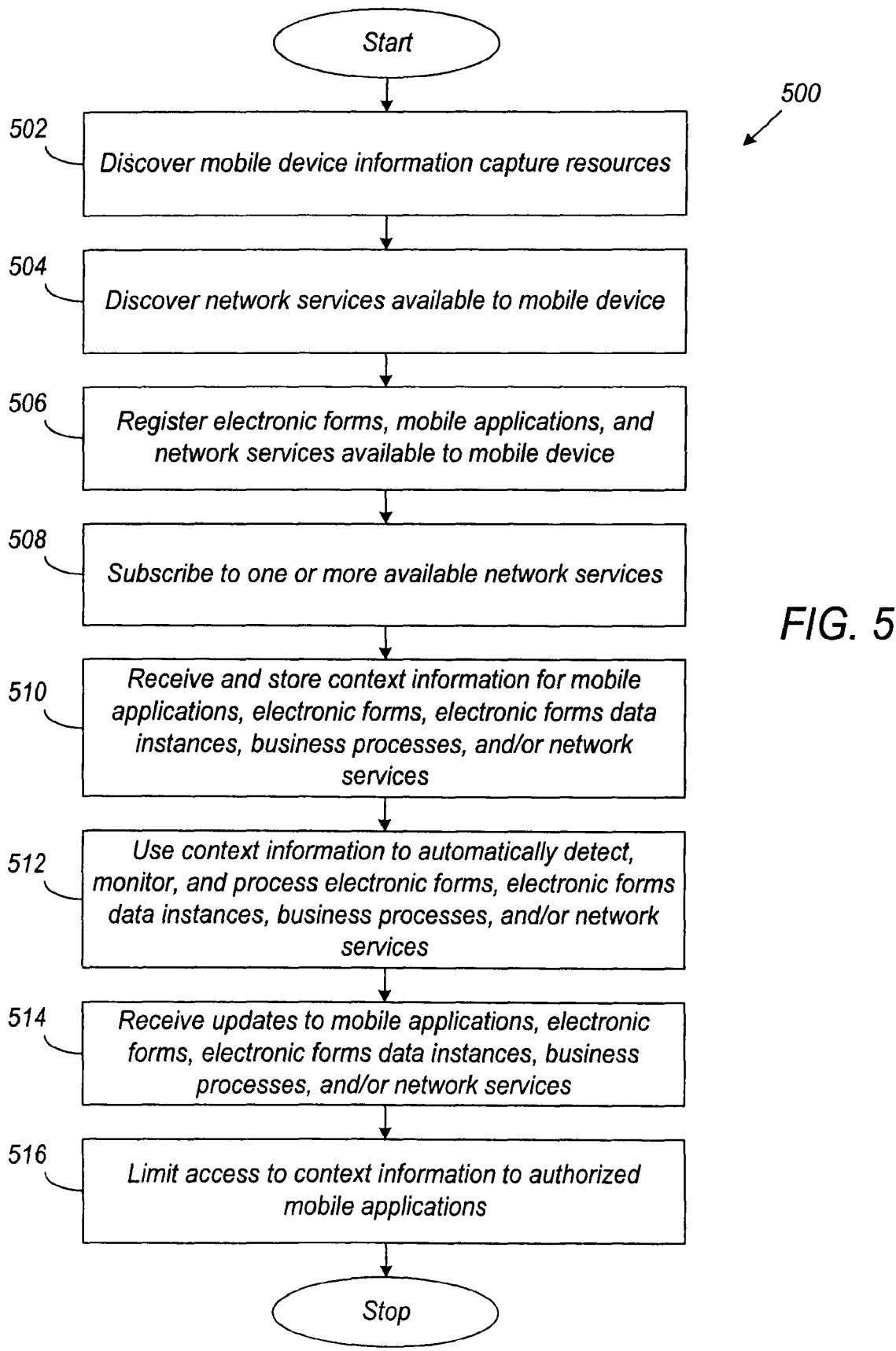
FIG. 5 illustrates an example of a method for automatically managing multiple applications, electronic forms, electronic forms data instances, business processes, and/or network services from multiple software providers according to embodiments of the invention.

Referring to FIG. 5, a method 500 for providing context information awareness and usage in a mobile device is shown. The method 500 begins at step 502 where information capture resources available on the mobile device are discovered and communicated with. Such information capture resources may include, but are not limited to, mobile device integrated and non-integrated information capture and input peripherals (e.g., camera, GPS, scanner, magnetic card reader, RFID readers, etc.). At step 504, network services that are available to the mobile device are also discovered and communicated with. Such network services may comprise subscription-based services as well as usage-base services and may include, for example, SIP, SMTP, SMS, location mapping, call conferencing, and the like, depending on the information capture resources available on the mobile device. These network services may then be registered in the mobile device at step 506 along with electronic forms, mobile applications associated therewith, electronic forms data instances, business processes, and/or network services. New applications, services, processes, and/or forms may also be registered in the mobile device as they become available.

If not done so already, at step 508, a user has the option of subscribing to one or more of the available network services. Context information for the mobile applications, electronic forms, data instances, business processes, and/or network services may then be received from the network services and stored in the mobile device at step 510. Thereafter, the mobile device allows the mobile applications to use the context information at step 512 to automatically detect, monitor, and process the electronic forms and electronic forms data instances according to the business processes defined by the software provider using one of the network services. At step 514, updates to the applications, electronic forms, electronic forms data instances, business processes, network services and/or context information are received by the mobile device from the network services. In some embodiments, access to the context information may be limited to authorize mobile applications only at optional step 516.

This application expressly incorporates by reference in their entirety the following U.S. patent applications: "Method and System for Customizing a Mobile Application Using a Web-Based Interface," by Mitch A. Brisebois, Brant Drummond, Arjun Mehta, Marc Chéné, and Mark Flannigan, 60/880,170, "Methods and System for Orchestrating Services and Data Sharing on Mobile Devices," by Marc Chéné Liam Peyton, Kevin McGuire, and Brant Drummond, assigned 60/880,328, and "Real Time Reports and Dashboards from Aggregated Mobile Data," by Mitch A. Brisebois, Arjun Mehta, Kevin McGuire, and Cyril Soga, 60/880,0176, each of which is being filed concurrently herewith on Jan. 12, 2007, and each of which is assigned to or under obligation of assignment to TrueContext Corp. of Ottawa, Canada.

This application also expressly incorporates herein by reference in their entirety the following published U.S. patent applications: U.S. Published Patent Application No. US2006161646, entitled "Policy-Driven Mobile Forms Applications," filed Jan. 18, 2006, U.S. Published Patent Application No. US20060080397, entitled "Content Management Across Shared, Mobile File Systems," filed Apr. 13, 2006, and U.S. Published Patent Application No. US20060089938, entitled "Distributed Scalable Policy Based Content Management," filed Oct. 8, 2004, all of which are assigned to TrueContext Corp. of Ottawa, Canada.

This application further expressly incorporates herein by reference in its entirety International Publication No. WO2004013782A1, entitled "Contextual Computing System," published Feb. 12, 2004, and assigned to TrueContext Corp. of Ottawa, Canada.

While the presently disclosed concepts have been described with reference to one or more particular embodiments, those skilled in the art will recognize that many changes may be made thereto without departing from the spirit and scope of the presently disclosed concepts. Any combination and/or sub-combination of the examples, embodiments, aspects, claims, methods, acts, processes, claim elements, or components disclosed herein, however termed, are expressly contemplated as falling within the present concepts. For example, although various aspects of the present concepts are set forth in the appended claims, wherein the dependent claims relate back to selected preceding claims, including the independent claim, it is to be understood that each of the dependent claims may properly depend from any of the preceding claims, to the extent not logically excluded, in accord with aspects of the present concepts. Thus, for example, the present concepts expressly include every possible combination of dependent claims with their respective independent claim, regardless of stated dependency. Further, the presently disclosed concepts are considered to include, without limitation, any combination and/or sub-combination of the disclosed examples, embodiments, aspects, claims, methods, acts, processes, claim elements, or components disclosed herein with the examples, embodiments, aspects, claims, methods, acts, processes, claim elements, or components disclosed in the references and applications incorporated by reference herein.

What is claimed is:

1. A system for automatically managing one or more applications created by a plurality of software providers, comprising:
   one or more network services comprising a mobile service contextualization component generating and sending one or more context information to at least one mobile device over the network;
   said at least one mobile device having a plurality of said one or more applications selected from the group consisting of mobile applications, electronic forms, electronic forms data instances and business processes running thereon, the at least one mobile device comprising:
a network context engine configured to access the one or more network services over a network;
a mobile context registry maintaining a listing of said one or more context information;
a device context engine coupled to said network context engine, said device context engine communicating with said mobile context registry and the at least one mobile device and said one or more applications utilizing said one or more context information from said mobile context registry characterizing the capabilities and requirements of each of said one or more applications.

2. The system of claim 1, wherein said at least one mobile device further comprises an extensible application programming interface.

3. The system of claim 2, wherein said extensible application programming interface is configured to allow the one or more applications to access said one or more context information and one or more information capture resources.

4. The system of claim 3, wherein the one or more information capture resources are selected from the group consisting of cameras, scanners, GPS, magnetic card readers, and RFID reader.

5. The system of claim 2, wherein said extensible application programming interface allows the one or more applications and network services to access one or more integrated resources of the mobile device, one or more nonintegrated resources of the mobile device and one or more sources of the mobile device.

6. The system of claim 5, wherein said at least one mobile device further comprises a call notification interface that is configured to receive updates for the one or more applications and configured to subscribe to changes in said one or more context information.

7. The system of claim 6, further comprising:
a secure framework configured to control access to one or more context information exposed to mobile applications running on the mobile device, wherein the secured framework is coupled with the network context engine, the extensible application programming interface and the call notification interface.

8. The system of claim 7, wherein the secure framework controls access to the one or more network services via a password protection scheme, or an encryption scheme, or a biometric input.

9. The system of claim 1, wherein the one or more network services further comprises a network awareness function to facilitate discovery of the one or more network services by the mobile device.

10. The one or more network services of claim 1, further comprising a security function controlling access to the one or more network services.

11. The system of claim 1, wherein the one or more context information is selected from the group comprised of electronic form and electronic forms data instance.

12. The system of claim 1, wherein the one or more context information for each of the one or more applications is received by the at least one mobile device from one of the one or more network services.

13. The system of claim 1, wherein the at least one mobile device is configured to automatically create a registry of processes that are available to the at least one mobile device.

14. The system of claim 1, wherein the network context engine is configured to automatically discover network services available to the at least one mobile device.

15. The system of claim 1, wherein the at least one mobile device is configured to limit access to the one or more context information to authorized mobile applications only.

* * * * *